(12) United States Patent
Mau et al.

(10) Patent No.: US 7,827,025 B2
(45) Date of Patent: Nov. 2, 2010

(54) EFFICIENT CAPITALIZATION THROUGH USER MODELING

(75) Inventors: Peter K. L. Mau, Bellevue, WA (US); Dong Yu, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 1511 days.

(21) Appl. No.: 10/819,023

(22) Filed: Apr. 6, 2004

(65) Prior Publication Data

US 2005/0228642 A1    Oct. 13, 2005

(51) Int. Cl.
*G06F 17/20* (2006.01)
*G06F 17/27* (2006.01)
*G06F 17/21* (2006.01)

(52) U.S. Cl. ............... 704/1; 704/9; 704/10
(58) Field of Classification Search ............ 704/9
See application file for complete search history.

(56) References Cited

U.S. PATENT DOCUMENTS

| | | | | |
|---|---|---|---|---|
| 5,715,469 | A * | 2/1998 | Arning | 715/210 |
| 5,761,689 | A * | 6/1998 | Rayson et al. | 715/210 |
| 5,819,265 | A | 10/1998 | Ravin et al. | 707/5 |
| 6,490,549 | B1 * | 12/2002 | Ulicny et al. | 704/10 |
| 6,618,697 | B1 * | 9/2003 | Kantrowitz et al. | 703/22 |
| 6,873,996 | B2 * | 3/2005 | Chand | 707/103 R |
| 6,981,040 | B1 * | 12/2005 | Konig et al. | 709/224 |
| 2002/0099744 | A1 * | 7/2002 | Coden et al. | 707/531 |
| 2005/0091030 | A1 * | 4/2005 | Jessee et al. | 704/4 |

FOREIGN PATENT DOCUMENTS

| | | |
|---|---|---|
| CN | 1470047 A | 1/2004 |
| JP | 63-066667 | 3/1988 |
| JP | 2003-167901 | 6/2003 |
| WO | WO0241557 A2 | 5/2002 |

OTHER PUBLICATIONS

Flournoy, et al."Personalization and Users' Semantic Expectations". ACM SIGIR'98 Workshop on Query Input and User Expectations, Melbourne, Australia, Aug. 1998.*
Brown, E., et al., "Capitalization Recovery for Text," Information Retrieval Techniques for Speech Applications, Springer Lecture Notes in Computer Science, vol. 2273, 2002, p. 11-eoa.
Kass, R., et al., "Modeling the User in Natural Language Systems," Computational Linguistics, vol. 14, No. 3, Sep. 1988, pp. 5-22.
Orwant, J., "For Want of a Bit the User Was Lost: Cheap User Modeling," IBM Systems Journal, vol. 35, Nos. 3&4, 1996, pp. 398-416.
"Automatic Determination of the True Case of a Word," IBM Technical Disclosure Bulletin, IBM Corp., New York, US, vol. 37, No. 2B, pp. 711-712, 1994.

(Continued)

*Primary Examiner*—Talivaldis Ivars Smits
*Assistant Examiner*—Jesse S Pullias
(74) *Attorney, Agent, or Firm*—Theodore M. Magee; Westman, Champlin & Kelly, P.A.

(57) ABSTRACT

A method of automatically capitalizing text utilizes a capitalization model. The capitalization model is trained from data that is taken from documents associated with a particular user. In particular, documents that are authored by the user such as e-mails, are used to train the model.

14 Claims, 6 Drawing Sheets

OTHER PUBLICATIONS

European Search Report from Application No. 05102510.4, filed Jan. 30, 2005.
The Second Office Action from the Chinese Patent Office in foreign application No. 200510065084.8 filed Apr. 6, 2005.
The Third Office Action from the Chinese Patent Office in foreign application No. 200510065084.8 filed Apr. 6, 2005.
The Fourth Office Action from the Chinese Patent Office in foreign application No. 200510065084.8 filed Apr. 6, 2005.
Correspondence regarding summons to attend Oral Proceedings for related European application 05102510.4, dated Feb. 26, 2010.
Notice of Rejection for related Japanese application 2005-110069, dated Jan. 19, 2010.

* cited by examiner

EFFICIENT CAPITALIZATION THROUGH USER MODELING

BACKGROUND OF THE INVENTION

The present invention relates to automatic text correction. In particular, the present invention relates to automatic capitalization.

Text generated from user input often includes capitalization errors. This is especially common in text generated by speech recognition systems. Although such recognition systems typically include simple rules for capitalizing the first word of each sentence and a small set of known names, they consistently fail to capitalize many words in the text. As a result, the capitalization error rate is around 5% for speech recognition systems. This represents a significant contribution to the errors present in the text provided by the speech recognition system.

Automatic capitalization systems have been developed in the past. However, these past systems have been less than ideal.

Under one such system, the capitalization rules are developed based on a large corpus of documents. The systems use a large corpus because it is thought that a large corpus will provide better coverage of possible capitalization forms and will thus provide a more accurate capitalization system.

However, such systems have numerous deficiencies. First, because a large corpus is used, the capitalization rules themselves become very large making it inefficient to search through the capitalization rules for each word in the text. In addition, because the rules are derived from a large corpus, they are typically derived once before the model is shipped and are not updated after the model is shipped. As a result, the model does not adapt to new capitalization forms. Furthermore, a particular user may capitalize words differently than the unknown authors of the documents in the large corpus. As a result, the model may not behave in the way expected by the user.

In other systems, a list of acceptable capitalizations is generated by a linguistic expert. While this list is more condensed than the large corpus list, it is expensive to produce since it requires an expert's involvement.

SUMMARY OF THE INVENTION

A method of automatically capitalizing text utilizes a capitalization model. The capitalization model is trained from data that is taken from documents associated with a particular user. In particular, documents that are authored by the user such as e-mails, are used to train the model.

DETAILED DESCRIPTION OF ILLUSTRATIVE EMBODIMENTS

Figure 1:
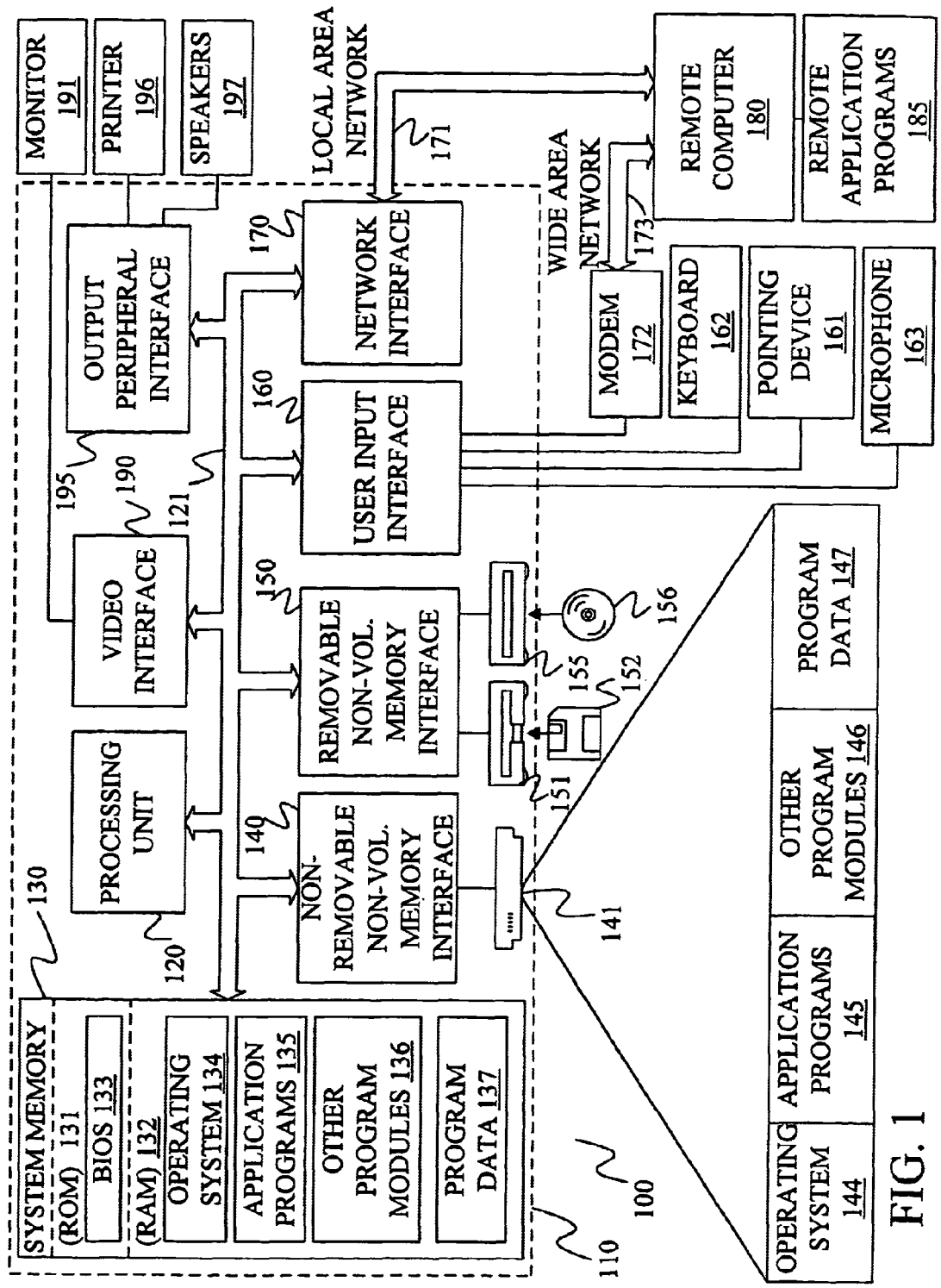
FIG. 1 is a block diagram of one exemplary environment in which the present invention may be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
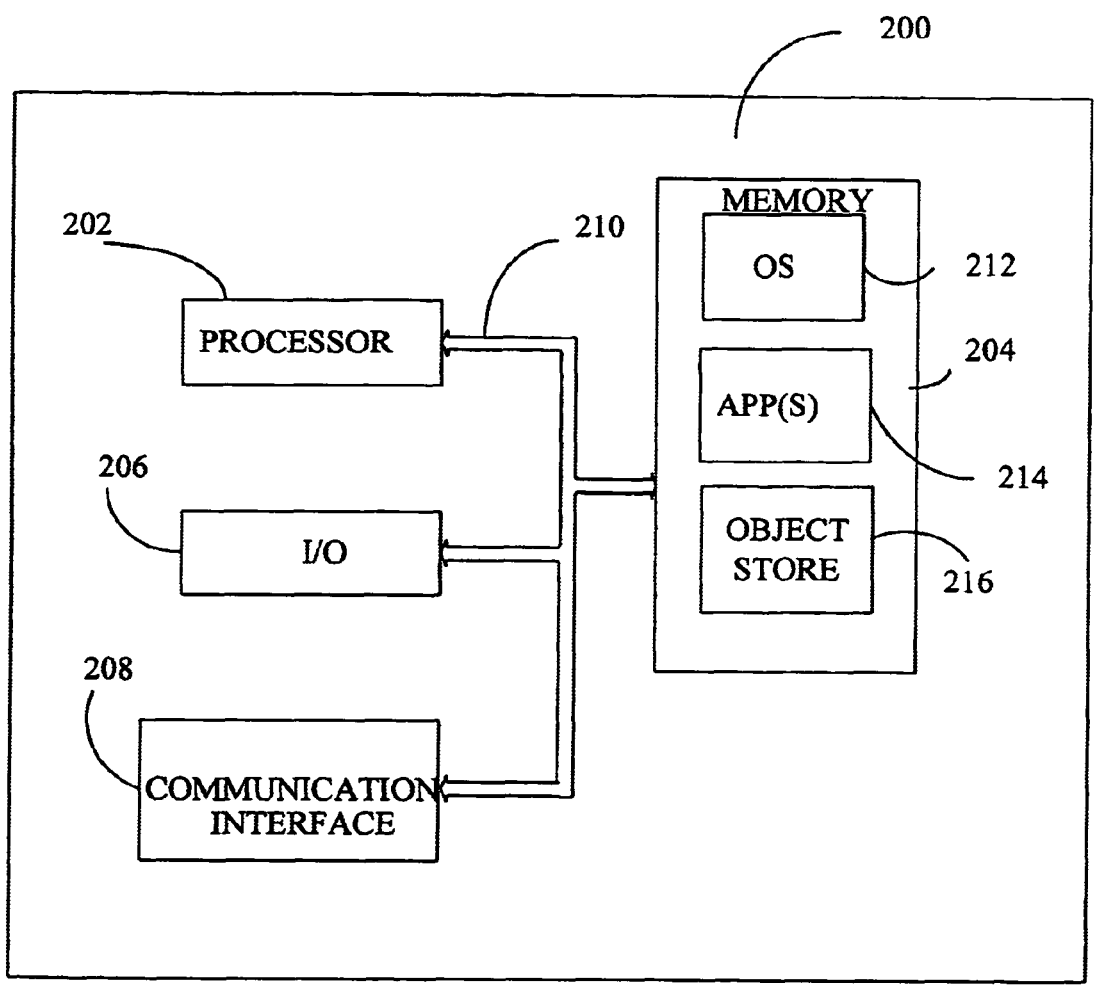
FIG. 2 is a block diagram of a mobile device in which the present invention may be used.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Under the present invention, a capitalization model is built for a specific user by relying on documents authored by or associated with the user. By limiting the capitalization training data to documents authored by or associated with the user, the size of the capitalization model is reduced while making the capitalization model more accurate for the particular user. In particular, the capitalization model built from the user's data includes the forms of capitalization that the user wants to use and does not include capitalization forms that the user does not find acceptable. Thus, by reducing the training data to only data associated with or authored by the user, the capitalization model of the present invention is more efficient and more accurate.

Figure 3:
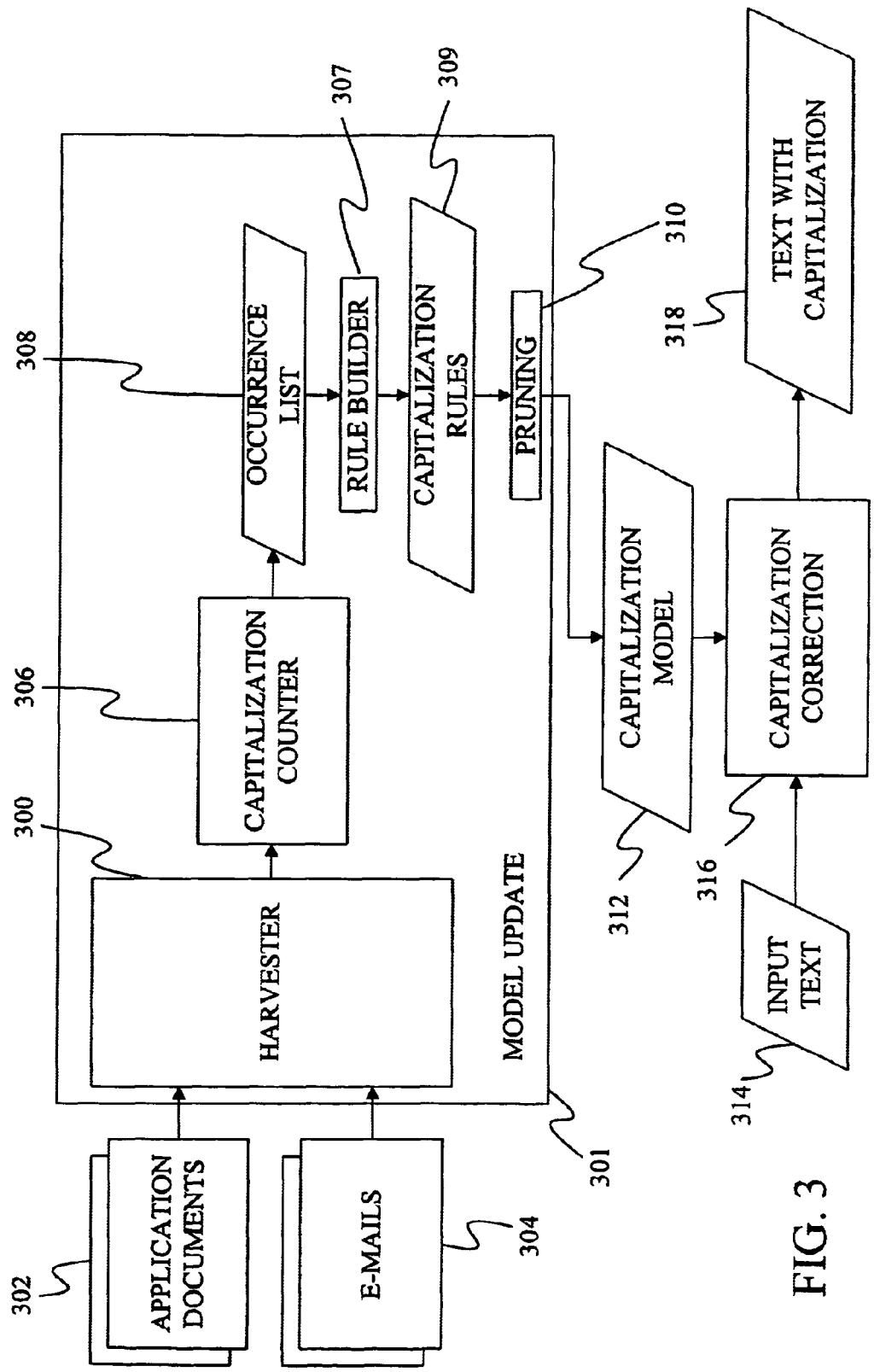
FIG. 3 is a block diagram of components used in constructing and using a capitalization model under an embodiment of the present invention.
Figure 4:
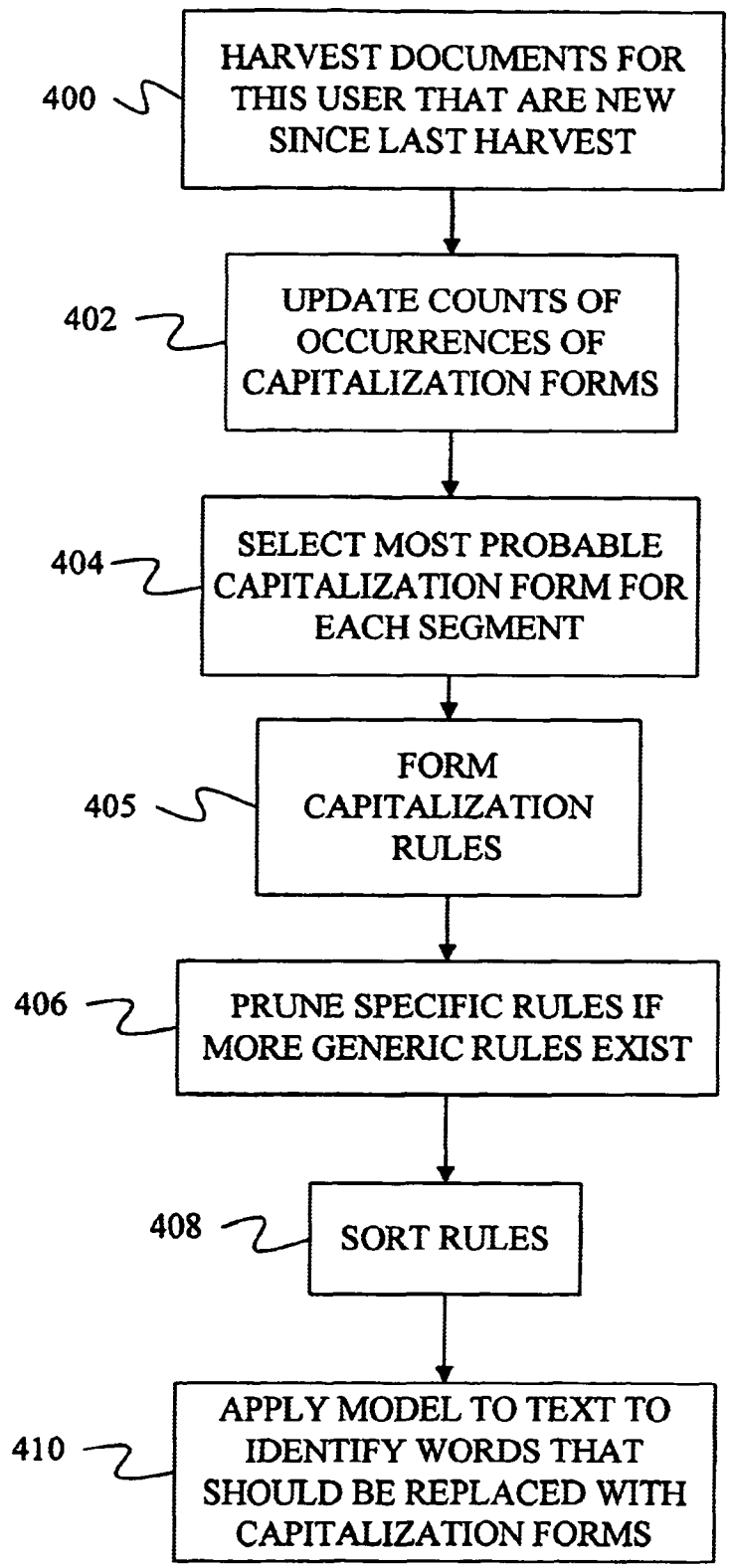
FIG. 4 is a flow diagram for building and using a capitalization model under an embodiment of the present invention.

FIGS. 3 and 4 provide a block diagram and a flow diagram, respectively, which illustrate the formation and use of a capitalization model under embodiments of the present invention.

In step 400 of FIG. 4, a harvester 300 of a model update unit 301 of FIG. 3 harvests documents such as application documents 302 and e-mails 304 that are associated with a user. Under one embodiment, harvester 300 is periodically run and only retrieves documents that were not present when the harvester was last run.

Under one embodiment, harvester 300 only harvests documents that were authored by the user. These include documents written by the user and e-mails sent by the user including e-mails that are forwarded or replied to by the user. As such, an e-mail written by someone else can be attributed to the user if the user forwards or replies to the e-mail. In other embodiments, any document opened by a user, whether authored by the user or not, is harvested by harvester 300. In further embodiments, documents stored on the user's local machine rather than on a network are harvested by harvester 300. In still further embodiments, directories located on a network that are associated with a user are also searched by harvester 300 to locate documents for the capitalization training.

At step 402 of FIG. 4, a capitalization counter 306 updates counts of occurrences of capitalization forms based on the text harvested by harvester 300. This is done preferably paragraph by paragraph. Only the paragraphs without a high percentage of capitalized words are used for counting. During this update step, counter 306 treats each unique combination of capitalized and lower case letters for a segment of text as a separate capitalization form. Thus, "State Department" and "STATE DEPARTMENT" represent two different capitalization forms for the text segment "state department". A segment of text can include a single word or as shown in this example, a sequence of words. In addition, the segments can be limited to a set of specific lengths such as one word or two words, or may not have their lengths limited in any manner.

For each text segment in the harvested documents, capitalization counter 306 determines if the segment appears in an occurrence list 308. If the segment does not appear in occurrence list 308 and does not include capitalization, it is ignored. If the segment does not appear in occurrence list 308 and only includes capitalization because one of the words in the segment is at the beginning of the sentence, the segment is also ignored. If the segment appears in occurrence list 308 and/or the segment includes capitalization, a count for the capitalization form of the segment is incremented in occurrence list 308.

Under one embodiment, occurrence list 308 consists of primary entries for each segment in lower case form with sub-entries for each capitalization form of the segment. For example, occurrence list 308 can have a format of:

<segment, total_occurrences>
    <cap_form1, occurrence_1>
    <cap_form2, occurrence_2>
    .
    <cap_formn, occurrence_n> where the primary entry consists of the "segment" in all lower case, and a total_occurrences value that indicates the total number of times the segment appears in the documents, regardless of the capitalization form of the segment. Each sub-entry consists of a specific capitalization form such as, "cap_form1", "cap_form2", and "cap_formn" and a count such as "occurrence 1", "occurrence 2", and "occurrence n", that provide the number of times each respective capitalization form was found in the documents. For example, if the word "state" appeared as "state" once, "State" twice, and as "STATE" four times, the primary entry would include the form "state" with a total_occurrences value of seven, one of the sub-entries would be for "State" with an occurrence value of two, and one of the sub-entries would be for "STATE" with an occurrence value of four.

When capitalization counter 306 encounters a new capitalization form for a segment, a new sub-entry for the capitalization form is added if a primary entry for the segment was already present in occurrence list 308 and the total occurrences count in the primary entry is incremented by one. If the segment was not present in occurrence list 308, a primary entry for the segment is added to occurrence list 308 together with a sub-entry for the specific capitalization form that was encountered in the training data. If a capitalization form that is present in occurrence list 308 is encountered, the total occurrence count for the segment is incremented by one and the occurrence count for the specific capitalization form is incremented by one.

If a lower case example of a segment is encountered in the document and the segment is present in occurrence list 308, the total occurrence count in the primary entry for the segment is incremented by one without incrementing any of the capitalization forms of the word. Note that if a lower case example of a segment is encountered in the training data and there is no primary entry for the segment, the segment is ignored.

Under one particular embodiment, the segments consist of word pairs and single words. Under one embodiment, word pairs will be stored when both words in the word pair include some form of capitalization or when one word in the word pair includes some form of capitalization and the second word in the word pair consists of a single word preposition that connects the capitalized word in the word pair to another capitalized word. For example, in the phrase "University of Washington", one word pair would be formed for "University of" and a second word pair would be formed for "of Washington." Each of these word pairs would be placed as a sub-entry beneath a separate primary entry in occurrence list 308. In other embodiments, any sequence of words that includes at least one capitalized letter can be stored as a separate entry in occurrence list 308. Such systems require a large amount of memory since a large number of unique strings will need to be stored.

Under one embodiment, if a word pair can be stored for two words in a document, a single word entry for the capitalized words in the word pair is not created. For example, if "University of" is found in the document, a single word pair entry "University of" will be placed or updated in occurrence list 308. However, an entry for "University" alone will not be updated in occurrence list 308.

Under some embodiments of the invention, capitalization counter 306 applies different weights to occurrences depending on the relationship between the user and the document in which the segment appears. In one particular embodiment, a weight of one is applied to an occurrence count if the document is authored by the user and a lower weight, such as 0.5 or 0.1, is applied to the occurrence count if the document is not authored by the user but is associated with the user.

After the occurrence counts have been updated at step 402, a rule builder 307 selects the most probable capitalization forms for each segment in occurrence list 308. Under one embodiment, this is done by selecting the capitalization form with the largest occurrence count. During this selection process, the lower case form for the segment is considered to be a possible capitalization form for the segment. The count for the lower case form of a segment is derived by subtracting the sum of the occurrence counts for all of the capitalization forms other than the lower case form from the total occurrence count for the segment. If the resulting difference is greater than all of the occurrence counts for the various capitalization forms, the lower case form of the word is selected as the most probable capitalization form.

After the most probable capitalization form of each segment has been selected at step 404, rule builder 307 constructs a set of capitalization rules 309 at step 405. A pruning element 310 then prunes certain capitalization rules at step 406. Specifically, if a more generic rule for a capitalized word is present after step 404, the relatively specific rules are removed. For example, if "Microsoft" is present, the more specific entry "from Microsoft" is removed. Similarly, if "Microsoft" and "Office" are both present, an entry for "Microsoft Office" would be removed. Note that all of the words with capitalization in a sequence of words must be present in smaller segments in order to remove the larger segment. For example, if "Office" was not present in the above example, then the entry for "Microsoft Office" would not be removed even though "Microsoft" is in the list.

After pruning the entries, pruning element 310 sorts the remaining rules to allow for efficient searching. In embodiments that allow single word and word pair entries, the entries are divided into a one-word group and a two-word group. Note that the entries in each group only include the proper capitalization form for the segment represented by the entry.

In embodiments that allow for longer sequences of words, the selected capitalization forms can be grouped according to the first word in the sequences of words. Under one embodiment, these capitalization forms are stored in the following structure:

```
<word, maxlength>
    <word, 1>
    <word word2, 2>
    <word word2B word3, 3>
    .
    .
    .
    <word...wordN, maxlength>
```

Where the top entry includes the word that is the index for all sequence of words that begin with this word, and maxlength is the number of words found in the longest sequence of words stored below the index. Below the top entry are a series of subentries that each consist of a sequence of words followed by a number indicating the number of words in the sequence. Multiple entries having the same length but different sequences of words may be included under the index entry. In the example above, one of the sub word entries is for the sequence of words "word word2" and the length of the sequence is indicated as being "2".

The sorted rules formed in step 408 are placed as a capitalization model 312 that is applied to a text 314 by a capitalization correction unit 316 at step 410. In particular, capitalization correction unit 316 searches capitalization model 312 for proper capitalization forms of words found in text 314 and then replaces the words in text 314 with the capitalization forms it finds to create text with capitalization 318. The methods for searching for the capitalization forms depend in part on how the capitalization forms were stored in capitalization model 312. Two separate methods for searching for the capitalization forms are discussed in the flow diagrams of FIGS. 5 and 6.

Figure 5:
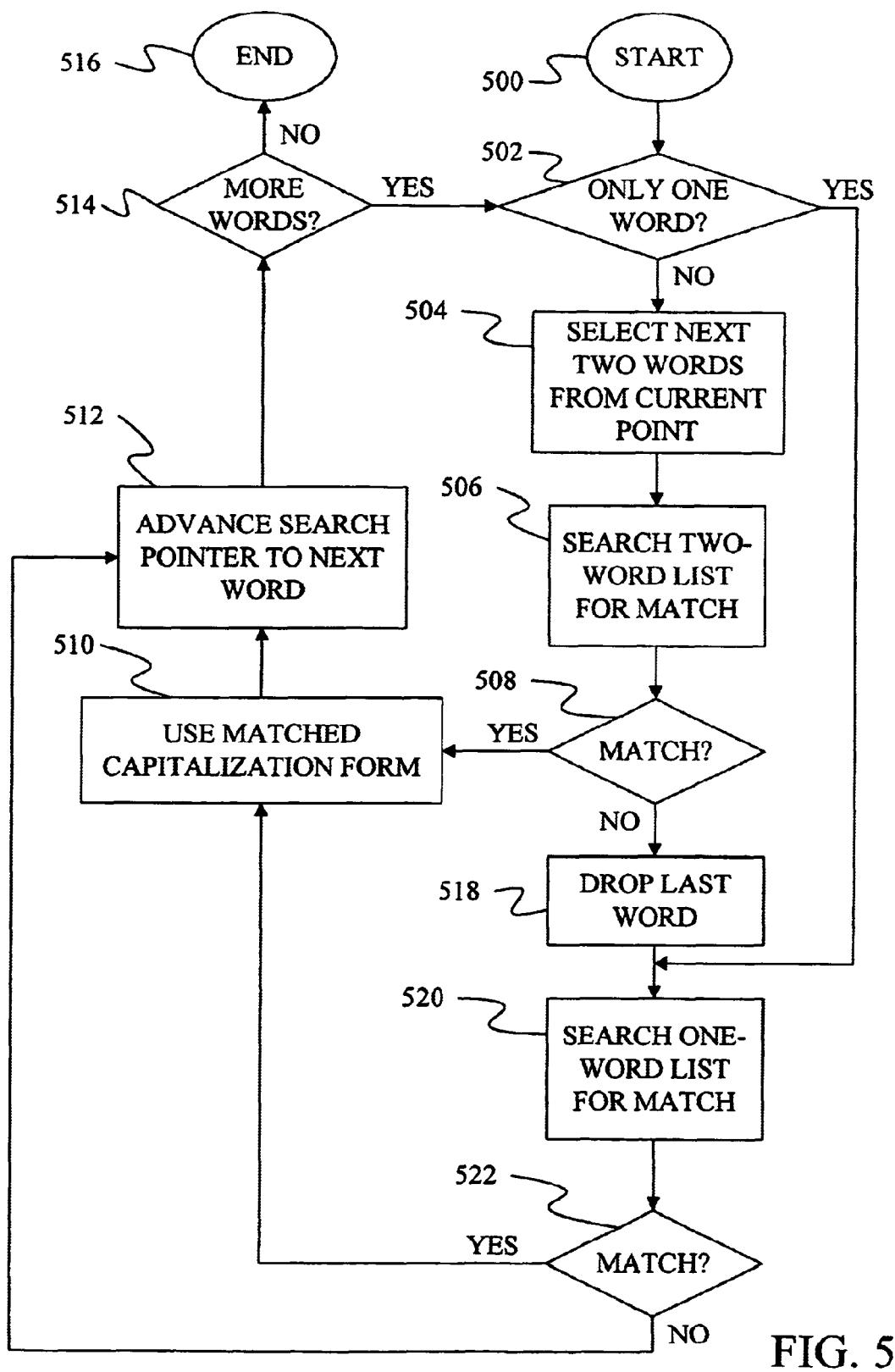
FIG. 5 is a flow diagram of a method of using a capitalization model under one embodiment of the present invention.

The method of FIG. 5 is used when the capitalization model is stored as two separate lists, one for single words, and one for two-word pairs. The process of FIG. 5 begins at step 500 and continues at step 502 where the current text string in text 314 is examined to determine if it contains only one word. If the text string contains more than one word, the process continues at step 504 where the next two words in text 314 are selected. At step 506, the selected words are searched for in the two-word list of the capitalization model to determine if there is a match in the two-word list. Because the two-word list contains word pairs in capitalization form and the two words selected from text 314 may not be capitalized, this search is performed using case insensitive comparisons.

If a search for the selected two words is found in the two-word list at step 508, the matched capitalization forms from the two-word lists are used in capitalized text 318 in place of the text that was in text 314 at step 510.

After the capitalization form has been placed in text 318, a search pointer is advanced to the next word in text 314 at step 512. The process then determines if there are more words after the current search pointer at step 514. If there are no more words, the process ends at step 516. If there are more words, the process returns to step 502 to see if there is only one word remaining. If there is more than one word, steps 504, 506 and 508 are repeated.

If a match for the selected two-word pair in input text 314 cannot be found at step 508, the last word in the pair is dropped at step 518. This produces a single search word that is used to search the one-word list at step 520. Similarly, if only one word is left in the current sentence of input text 314 at step 502, that single word is used to search the one-word list for a match at step 520.

If a match for the single word is found at step 522 the matched capitalization form is used in place of the single word in text 318 at step 510. At step 512, the search pointer is advanced to the point after the single word that matched the one-word list entry.

If a match for the single word is not found at step 522, the search pointer is advanced to the point after the single word at step 512 and the form of the single word from text 314 is placed in text 318. The process then continues at step 514 to determine if there are more words in the input text.

Figure 6:
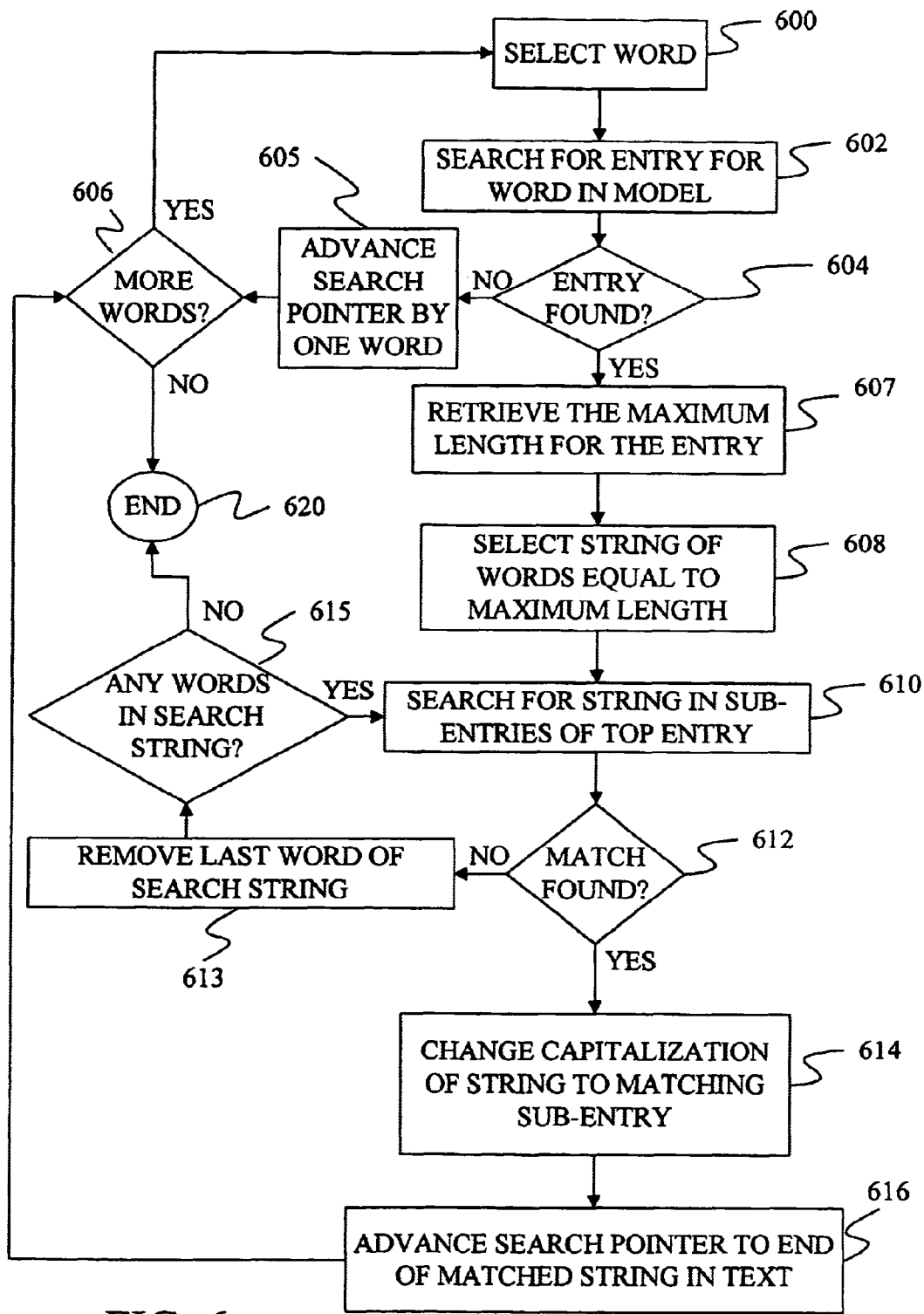
FIG. 6 is a flow diagram of a method of using a capitalization model under a second embodiment of the present invention.

FIG. 6 provides a flow diagram for applying a capitalization model when the capitalization model is stored as word string entries that are indexed by the first word of each word string. At step 600 of FIG. 6, a word is selected from text 314. At step 602, the selected word is searched for in the capitalization model. In particular, a search is performed to determine if the word is found as a top entry for an index structure that consists of the top entry and a set of sub-entries, one for each string that is headed by the word in the top entry. Under one embodiment, the top entry of each index structure also includes the length of the longest string that is found as a sub-entry under the top entry.

If a top entry is not found at step 604, step 605 advances the search pointer by one word and then the process determines if there are more words in input text 314 at step 606. If there are more words, the process returns to step 600 and steps 600, 602 and 604 are repeated.

When a selected word matches a top entry at step 604, the maximum length associated with that top entry is retrieved at step 607. The maximum length is used to select a string of additional words from text 314 at step 608. This string is appended to the first selected word to form a search string. For example, if the maxlength of the entry is three, then the next two words in text 314 would be selected and appended to the previously selected word to form the search string.

At step 610, a search for the selected string is performed on the sub-entries under the matching top entry that have the same length as the length of the search string. If no match is found at step 612, the last word in the search string is removed at step 613. The new search string is then examined at step 615 to determine if it contains any words. If the search string does not contain any words, the process ends at step 620. If the search string contains at least one word, a new search for the smaller string is performed at step 610. Thus, step 610, 612, 613 and 615 are repeated until the search string becomes small enough that a match is found at step 612 or there are no further words in the search string.

After a match is found at step 612, the matching string in capitalization model 312 is used in place of the search string in capitalized text 318 at step 614. After the capitalization form of the string has been placed in capitalization text 318, the search pointer is advanced to the end of the matched string in text 314 at step 616. The process then returns to step 606 to determine if there are more words in text 314. If there are more words, the process returns to step 600. If there are no more words, the process ends at step 620.

By limiting the training data used to form capitalization model 312 to documents that are authored by the user or directly associated with the user, the present invention reduces the size of capitalization model 312 and makes capitalization model 312 more accurate. Also, by allowing the model to be periodically updated from user data, the model can learn new forms of capitalization as they are adopted by the user.

Although the present invention has been described with reference to particular embodiments, workers skilled in the art will recognize that changes may be made in form and detail without departing from the spirit and scope of the invention.

What is claimed is:

1. A method of training and using a capitalization model for automatically capitalizing text for a user, the method comprising:

harvesting documents having paragraphs for training, wherein only documents authored by the user are harvested, wherein documents authored by the user include documents written by the user, e-mails authored by other users but attributed to the user because the user forwarded the e-mails, and e-mails authored by other users but attributed to the user because the user, replied to the e-mails, the training documents comprising text segments; and a processor using paragraphs in the collected training documents to train the capitalization model wherein the processor using paragraphs in the collected training documents to train the capitalization model comprises:

counting occurrences of capitalization forms in the collected training documents, wherein counting occurrences of capitalization forms comprises:

selecting paragraphs from a training document such that only paragraphs without a high percentage of capitalized words are selected;

selecting a text segment from a selected paragraph;

determining if a primary entry, comprising an all lower case form of the text segment, is present in an occurrence list;

if the text segment includes capitalization and a primary entry for the text segment is not already present in the occurrence list, adding a primary entry for a lower case form of the text segment and a sub-entry for a capitalization form of the text segment to the occurrence list and increasing a weighted occurrence count for the sub-entry by weighting the occurrence count based on the degree to which the training document is associated with a user;

if the text segment includes capitalization and a primary entry for the text segment is present in the occurrence list but a sub-entry for the capitalization form of the text segment is not present in the occurrence list, adding a sub-entry for the capitalization form of the text segment to the occurrence list and increasing a weighted occurrence count for the sub-entry by weighting the occurrence count based on the degree to which the training document is associated with a user;

if the text segment does not include capitalization, using the determination of whether a primary entry is already present in the occurrence list to select between not adding a primary entry for the text segment and increasing a weighted occurrence count for a primary entry for the text segment, wherein increasing a weighted occurrence count comprises weighting the occurrence count based on the degree to which the training document is associated with the user;

adding a capitalization form comprising two words to the capitalization model based on the weighted occurrence counts, wherein each of the two words contains capitalization;

adding capitalization forms comprising single words to the capitalization model based on the weighted occurrence counts for the primary entry and all of the sub-entries of the single words in the occurrence list;

pruning the capitalization form comprising two words from the capitalization model if each of the two words appears as a single word capitalization form in the capitalization model with the same capitalization as in the capitalization form comprising two words; and a processor using the capitalization model to capitalize words in a text.

2. The method of claim 1 wherein the limitations require that the training documents be stored on the user's local machine.

3. The method of claim 1 wherein the limitations require that the training documents be stored in a directory on a network associated with the user.

4. The method of claim 1 wherein counting occurrences of capitalization forms comprises counting occurrences of word pairs in which at least one word in the word pair includes a capitalized character.

5. The method of claim 4 wherein counting occurrences of word pairs comprises counting an occurrence of a word pair comprising a word with at least one capitalized character and a preposition that is found between the word and a second word that has at least one capitalized character.

6. The method of claim 4 wherein counting the occurrences of word pairs comprises counting an occurrence of a word pair comprising a first word with at least one capitalized character and an adjacent second word with at least one capitalized character.

7. The method of claim 1 wherein training the capitalization model comprises storing capitalization forms for word pairs in a word pair list and storing capitalization forms for single words in a separate single word list.

8. The method of claim 1 wherein using the capitalization model to capitalize words comprises searching a word pair list for a match to a word pair in the text before searching a single word list for one of the words in the word pair.

9. The method of claim 1 wherein a higher weight is applied to an occurrence count if a document is authored by the user.

10. The method of claim 1 further comprising updating the capitalization model after the capitalization model has been trained.

11. A computer-readable storage medium having stored thereon computer-executable instructions that when executed by a processor cause the processor to automatically capitalize text through steps comprising:

harvesting training data from paragraphs in documents associated with a particular user, wherein only documents authored by the user are harvested, wherein documents authored by the user include documents written by the user, e-mails authored by other users but attributed to the user because the user forwarded the e-mails, and e-mails authored by other users but attributed to the user because the user replied to the e-mails;

using the training data to train a capitalization model by:

counting occurrences of capitalized words in the training data, wherein counting occurrences comprises:

selecting a text segment from the training data;

determining if a primary entry, comprising an all lower case form of the text segment, is present in an occurrence list;

if the text segment includes capitalization and a primary entry for the text segment is not already present in the occurrence list, adding a primary entry for a lower case form of the text segment and a sub-entry for a capitalization form of the text segment to the occurrence list and increasing an occurrence count for the sub-entry;

if the text segment includes capitalization and a primary entry for the text segment is present in the occurrence list but a sub-entry for the capitalization form of the text segment is not present in the occurrence list, adding a sub-entry for the capitalization form of the text segment to the occurrence list and increasing an occurrence count for the sub-entry;

if the text segment does not include capitalization, using the determination of whether a primary entry is already present in the occurrence list to select between not adding a primary entry for the text segment and increasing an occurrence count for a primary entry for the text segment;

adding a sequence of two words to the capitalization model based on the occurrence counts, wherein each of the two words contains capitalization;

adding single words to the capitalization model based on the occurrence counts; and pruning the sequence of two words from the capitalization model if each of the two words appears as a single word in the capitalization model with the same capitalization as in the sequence of two words; and using the capitalization model to automatically capitalize text associated with the particular user.

12. The computer-readable storage medium of claim 11 wherein using the training data to train a capitalization model comprises searching the training data for sequences of words with capitalization, where the sequences comprise at least one word with capitalization.

13. The computer-readable storage medium of claim 12 further comprising searching for single words with capitalization.

14. The computer-readable storage medium of claim 13 further comprising counting the occurrence of a single word with capitalization only if the occurrence does not form part of an occurrence for a sequence of words with capitalization.

\* \* \* \* \*

UNITED STATES PATENT AND TRADEMARK OFFICE
CERTIFICATE OF CORRECTION

PATENT NO.      : 7,827,025 B2                                      Page 1 of 1
APPLICATION NO. : 10/819023
DATED           : November 2, 2010
INVENTOR(S)     : Mau et al.

It is certified that error appears in the above-identified patent and that said Letters Patent is hereby corrected as shown below:

In Page 2, Title page in item (56), under "Other Publications" column 1, line 3, below "European Search Report from Application No. 05102510.4, filed Jan. 30, 2005." insert -- The First Office Action of the Chinese Patent Office in foreign application no. 200510065084.8 filed Apr. 6, 2005. --.

In column 10, line 15, in Claim 1, delete "user," and insert -- user --, therefor.

Signed and Sealed this
Tenth Day of May, 2011

David J. Kappos
*Director of the United States Patent and Trademark Office*